June 25, 1946.　　　F. W. TERHAAR　　　2,402,788
METHOD OF MAKING DIES
Filed Sept. 18, 1945　　　2 Sheets-Sheet 1

INVENTOR.
FREDERICK W. TERHAAR
BY
ATTORNEY

June 25, 1946. F. W. TERHAAR 2,402,788
METHOD OF MAKING DIES
Filed Sept. 18, 1945 2 Sheets-Sheet 2

INVENTOR.
FREDERICK W. TERHAAR
BY
ATTORNEY

Patented June 25, 1946

2,402,788

UNITED STATES PATENT OFFICE 2,402,788

METHOD OF MAKING DIES

Frederick W. Terhaar, Cold Spring, Minn., assignor to Solar Aircraft Company, San Diego, Calif., a corporation of California Application September 18, 1945, Serial No. 617,065

4 Claims. (Cl. 25—155)

This invention relates to the production of dies, molds and the like and has as a general object to facilitate the making of dies for stamping fractional sections of irregularly shaped sheet metal conduits such as aeroplane exhaust structures.

A more specific object is to facilitate the making of dies for flanged fractional stampings of predetermined greater peripheral extent than the finished fractional stamping.

The invention and specific objects and features thereof can be most easily explained with reference to the drawings, in which.

Figure 1:
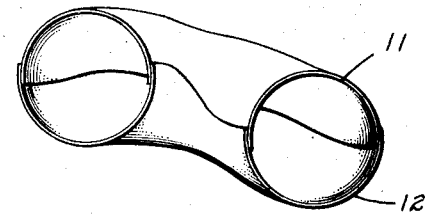
Fig. 1 is a cross-section showing two half stampings assembled in predetermined overlapping relation ready to be lap welded together to form a circular conduit.

Referring first to Fig. 1, there is shown a conduit member 10 consisting of two half sections 11 and 12, respectively, which are positioned with their longitudinal edges in overlapping relation ready to be lap welded together by any known welding process, or connected by riveting or bolting. Regardless of the method used to join the overlapping edges, it is important that the extent of overlap be uniform and that the cross-sectional shape of the finished conduit be of accurate shape and dimensions. In order to meet these requirements, the half sections 11 and 12 must be of accurate arcuate dimensions.

It has been found that a convenient and practical method of forming the half sections 11 and 12 accurately is to first stamp flanged half sections of predetermined greater depth than the finished half sections and then trim the flanges and a portion of the side wall away by running the flanged stampings through a nibbling machine which makes a cut an accurately gauged distance from the flange.

Figure 2:
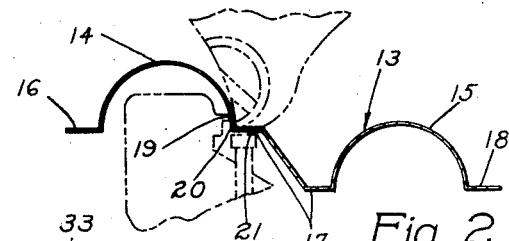
Fig. 2 is a cross-section showing a flanged half stamping formed from dies prepared in accordance with the invention and shown positioned in a nibbling machine for trimming to form one of the half sections shown in Fig. 1.

Thus there is shown in Fig. 2 a half stamping 13 having a pair of arcuate sections 14 and 15 each of larger arcuate extent than the sections 11 and 12 of Fig. 1 and having flanges 16, 17 and 18 projecting from their edges. There is shown in broken lines in Fig. 2 a portion of a nibbling machine having a stationary blade 19 and an arcuately reciprocal blade 20 and a rest 21. By resting the flange 17 of the stamping 13 upon the rest 21 while feeding the stamping past the cutting blades 19 and 20, the sections can be trimmed longitudinally along a line parallel to and uniformly spaced from the flange 17. The other flanges 16 and 18 function in a similar way to gauge the line of cut on both edges of the arcuate sections 14 and 15.

A problem has been encountered in producing dies for stamping half sections, such as the half section 13, so that the arcuate sections 14 and 15 will be of predetermined greater depth than the trimmed stampings, such as 11 and 12, and the present invention consists in a method of fabrication that solves this problem and will now be described with reference to Figs. 3 through 6.

Figure 3:
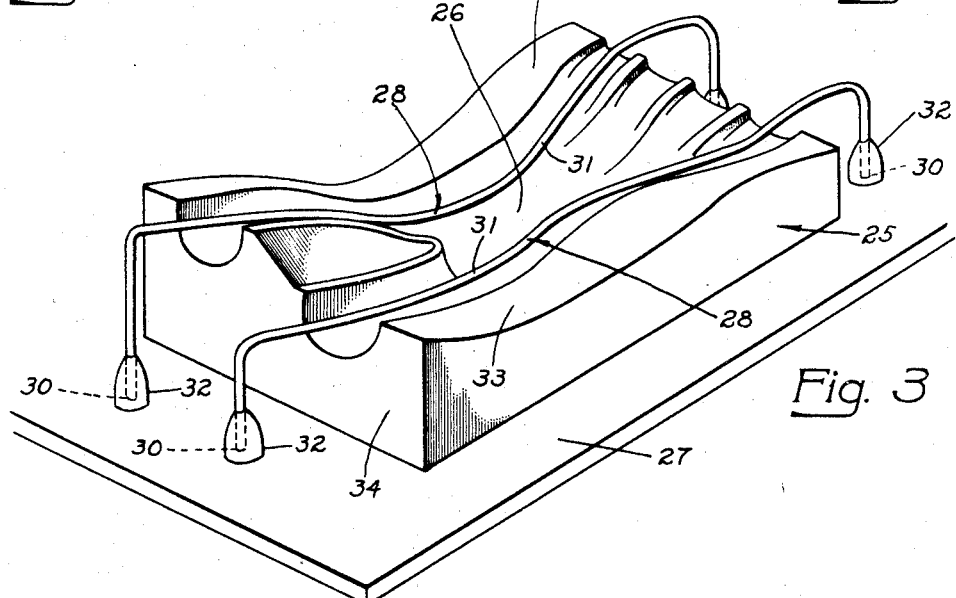
Fig. 3 is a perspective view illustrating the initial step in preparing a die in accordance with the present invention.

Referring to Fig. 3 there is shown a negative pattern 25 having a cavity 26 therein corresponding in shape to one-half of the finished conduit member that is to be produced. In other words, the pattern 25 if juxtaposed to a complementary pattern would form therewith a cavity, the surface of which conforms exactly to the exterior surface of the finished conduit member to be formed. The half pattern 25 and its complementary pattern can be formed directly from the original mock-up of the finished conduit. The problem is to produce from the negative pattern 25 a die that can be used to stamp a flanged half section, such as the half section 13 in Fig. 2, which when trimmed as described in connection with Fig. 2 will form a section of the proper shape and size to be lap welded to another section to form a conduit corresponding in shape and dimensions to the original mock-up.

The first step in the present process is to place the negative half pattern 25 on a level plane surface 27 and shape and position a pair of supporting members 28, 28 so that their ends 30 rest on the surface 27 and their intermediate portions 31 extend through the cavity 26 in the pattern 25. These rods can be stabilized so that they are self-supporting by forming clay bolsters 32 about their ends where they rest upon the surface 27.

Figure 4:
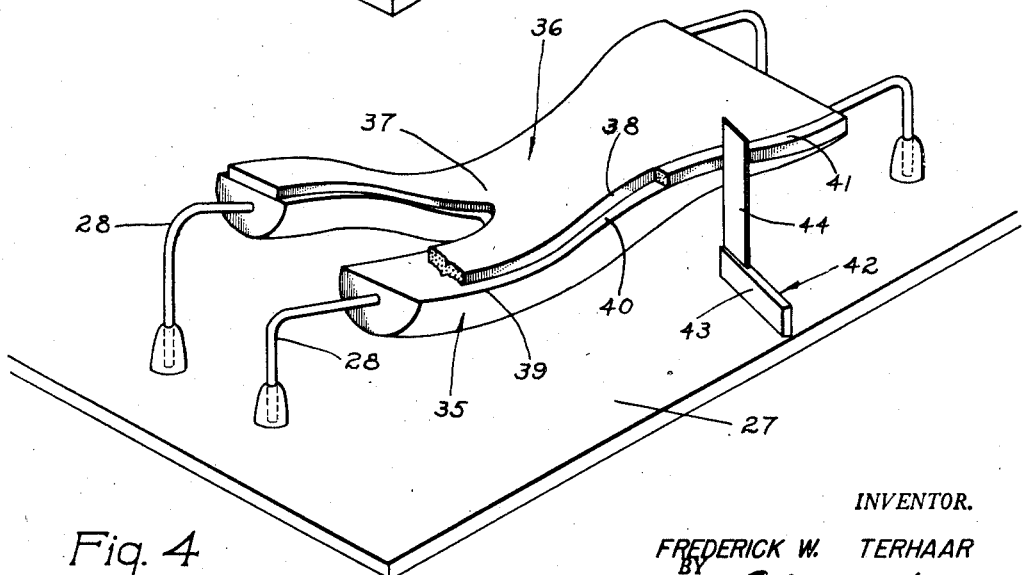
Fig. 4 is a perspective view showing a later stage in the development of a die in accordance with the method of the invention.

The next step in the process is to fill the cavity 26 in the pattern 25 with a plastic material such as plaster of Paris, the surface of the cavity 26 being first coated with a suitable soap or other material to prevent the plaster from sticking. While the plaster of Paris is still plastic, it is shaped to make the upper surface flush with the upper surface 33 of the pattern 25 and its end surfaces flush with the ends 34 of the pattern 25. The plaster is then permitted to set, after which it is removed from the pattern 25 and constitutes a positive pattern 35 as shown in Fig. 4. The supporting members 28, 28 are, of course, solidly anchored to the positive pattern 35 and function to support the pattern 35 at the same distance above the plane surface 27 after the negative pattern 25 has been removed.

The next step is to build the positive pattern 35 up to a predetermined additional thickness by adding a layer of plaster 36 to the upper surface thereof. This layer 36 is of uniform thickness and can be most readily built up in two stages. In the first stage a central portion 37 is built up, the edges 38 of this central section being spaced inwardly from the marginal edges 39 of the case 35. This permits ready gauging of the thickness of the layer 37 by measuring from the exposed marginal edge 40 of the pattern 35. After the portion 37 has set or partially set, the layer 36 is completed by filling in additional plaster at the edges and trimming it to form a marginal section 41.

The upper surface of the marginal section 41 can be very readily produced by dragging a straight edged scraping tool along the upper surface of the middle section 37. The side edges can be readily trimmed by dragging a tool, such as a square 42, along the edge, the square having a base portion 43, the under surface of which slides along the plane surface 27 and having an upstanding blade 44, one edge of which bears against the edge 39 of the pattern 35.

The pattern resulting from the building up of the pattern 35 in the manner described is then used as a mold to form a pattern for the desired die. Two procedures can be followed in doing this.

Figures 5, 6:
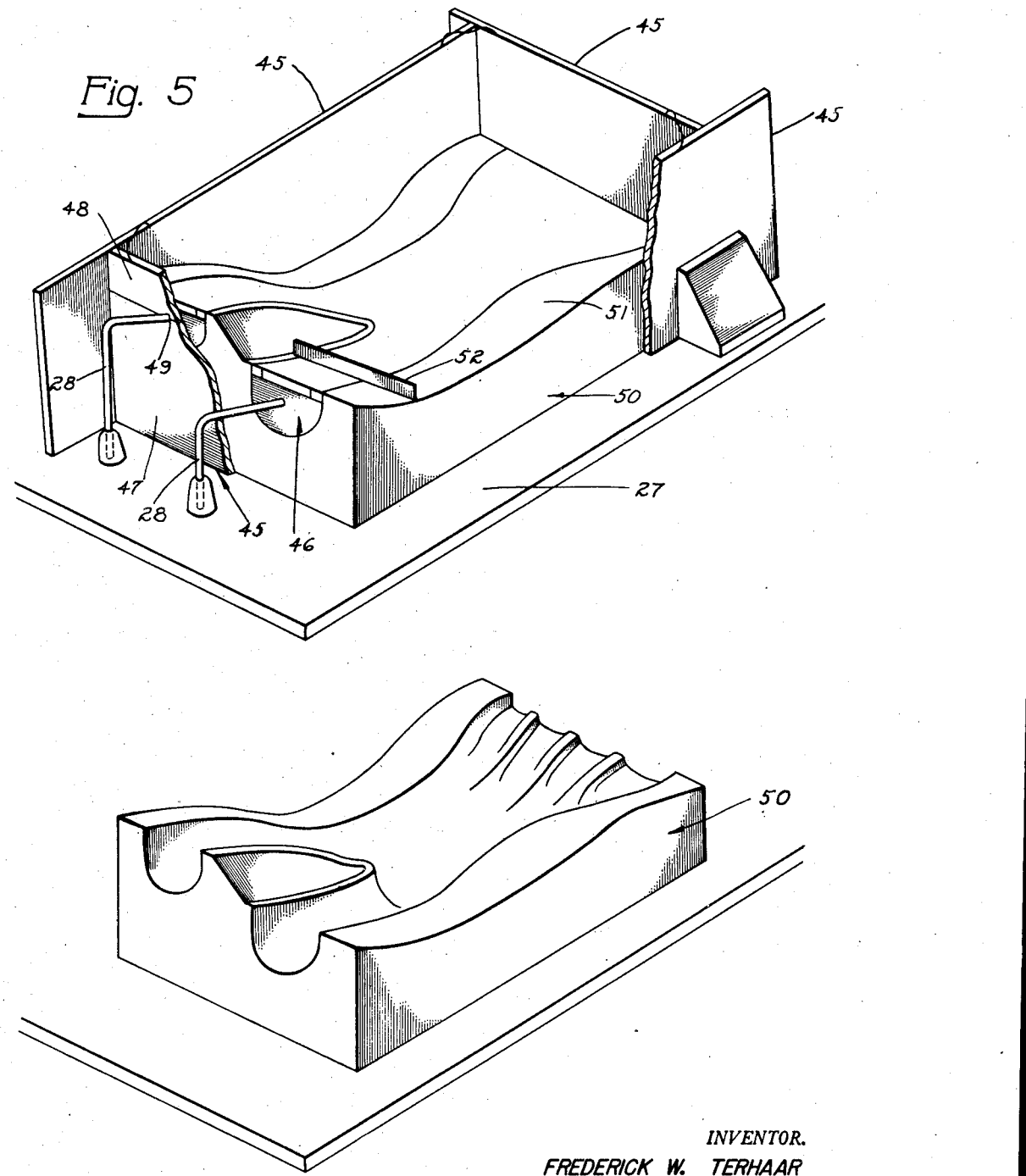
Fig. 5 is a perspective view showing a third, later stage in practicing the method of the invention.
Fig. 6 is a perspective view of a finished die made by the method of the invention.

One procedure is to build the original negative pattern 25 (Fig. 3) up to the depth of the desired die. Referring to Fig. 5 this can be conveniently done by replacing the built-up pattern of Fig. 4, identified in Fig. 5 by the reference character 46 in the negative pattern 25, roughening the exposed upper surface of the pattern 25, and adding additional new plaster, which bonds to the roughened surface. The new plaster is first built up to a depth slightly above the pattern 46, and the excess plaster then removed by dragging a straight edged cutting tool 52 across the upper surface of the pattern 46, the latter surface acting as a guide for the tool 52. The pattern 46 is then removed, leaving the completed die pattern 50 as shown in Fig. 6. The formation of the side surface of the additional layer 51 of plaster added to the negative pattern 25 may be formed by building up retaining side walls 45 on the plane surface 27 around the pattern 25, and pouring relatively thin plaster on top of the exposed, roughened upper surface of the pattern 25. The end walls 45 may be formed in two sections, 47 and 48, having registering notches 49 therein to permit passage through the walls of the supporting members 28, 28. Alternatively the supporting members 28, 28 can be cut off flush with the ends of the pattern 46 after the completion of that pattern by the process disclosed in Fig. 4, thereby eliminating the need of forming apertures or notches in the end walls 45. If the side walls 45 are employed to determine the side surfaces of the layer 51 it is convenient to remove them as soon as the plaster has partially set and prior to formation of the upper surface of the layer with the straight edged cutting tool 52.

The other procedure that may be followed is to erect the side walls 45 on the plane surface 27 around the built up pattern 46 and pour relatively thin plaster into the mold so formed. When the plaster has partially set, the side walls 45 are removed and the upper surface 51 formed with the straight edged cutting tool 52 as previously described.

It will be observed that the die pattern 50 differs from the starting pattern 25 of Fig. 3 only in that it is of uniformly greater depth. The plaster pattern 50 can then be used by well known methods to produce a metallic die in which the sheet metal half stampings 13 (Fig. 2) can be stamped.

It will be observed that the process or method of the invention involves a simple and straightforward procedure that can be practiced by relatively unskilled workmen to produce dies of accurately gauged increased depth from original dies formed directly from a mock-up of the finished article to be produced.

Various modifications and departures from the exact procedure described can be made while still employing the essential features of the invention which it is to be limited only to the extent set forth in the appended claims.

I claim:

1. The method of making a final die pattern having a cavity of predetermined greater depth than that in a first die pattern, which method comprises the steps of: (1) resting the first die pattern on a plane supporting surface; (2) positioning a supporting member with one portion thereof resting on said plane surface beyond said first die pattern and another portion extending within the cavity of said first die pattern; (3) filling said cavity with a plastic material in which said other portion of said supporting member is embedded and forming the free surface of the plastic material flush with the upper surface of said first die pattern and hardening it to produce a first negative pattern of the cavity in said first die; (4) separating said first negative pattern from said first die pattern and positioning it in its original spaced relation above a plane surface by resting said one portion of said supporting member on said plane surface; (5) increasing the height of said first negative pattern by adding a layer of plastic material to the said free surface to a uniform depth thereover and hardening it in bonded relation to said first negative pattern to produce therewith a second negative pattern; and (6) using said second negative pattern as a mold to form the desired final die pattern, including the step of forming the upper free surface of the final die pattern by making it flush with the upper surface of said second negative pattern.

2. The method described in claim 1 in which step 5 thereof includes the step of forming the sides of said added layer perpendicular to said plane surface by movement of a trimming tool therealong, which trimming tool has a flat base slidable along said plane surface and a trimming edge perpendicular to said flat base.

3. The method described in claim 1 in which step 5 thereof includes the steps of: (a) forming a layer of plastic material on said free surface of smaller lateral dimension than said free surface to expose the marginal portion of said free surface and gauging the depth of said layer by measuring the height of its sides above the said exposed marginal surface; (b) hardening said layer; (c) adding excess plastic material to the edges of said layer; and (d) shaping said excess plastic material by trimming the upper surface thereof flush with the upper surface of said first layer of smaller lateral dimension, and trimming the lateral surface perpendicular to said plane surface and flush with the upper edge of said first negative pattern.

4. The method of making a final die pattern having a cavity of predetermined greater depth than that in a first die pattern, which method comprises the steps of: (1) resting the first die pattern on a plane supporting surface; (2) positioning a supporting member with one portion thereof resting on said plane surface beyond said first die pattern and another portion extending within the cavity of said first die pattern; (3) filling said cavity with a plastic material in which said other portion of said supporting member is embedded and forming the free surface of the plastic material flush with the upper surface of said first die pattern and hardening it to produce a first negative pattern of the cavity in said first die; (4) separating said first negative pattern from said first die pattern and positioning it in its original spaced relation above a plane surface by resting said one portion of said supporting member on said plane surface; (5) increasing the height of said first negative pattern by adding a layer of plastic material to the said free surface to a uniform depth thereover and hardening it in bonded relation to said first negative pattern; to produce therewith a second negative pattern (6) replacing said first die and increasing the height of said first die by adding a layer of plastic material to the upper surface of said layer flush with the upper surface of said second negative pattern; and (7) removing said second negative pattern from said mass, which then constitutes said final die.

FREDERICK W. TERHAAR.